No. 847,607.

PATENTED MAR. 19, 1907.

C. W. ROBINSON.
WHEEL MACHINE.
APPLICATION FILED AUG. 3, 1906.

Witnesses:
J. N. Daggett.
F. W. Hoffmeister.

Inventor:
Charles W. Robinson,
By J. C. Warner,
Attorney.

No. 847,607.

PATENTED MAR. 19, 1907.

C. W. ROBINSON.
WHEEL MACHINE.
APPLICATION FILED AUG. 3, 1906.

Witnesses:
J. N. Daggett,
F. W. Hoffmeister.

Inventor:
Charles W. Robinson.
By J. C. Warnes
Attorney.

No. 847,607. PATENTED MAR. 19, 1907.
C. W. ROBINSON.
WHEEL MACHINE.
APPLICATION FILED AUG. 3, 1906.

Witnesses:
J. N. Daggett.
F. W. Arffmister.

Inventor:
Charles W. Robinson
By J. C. Warnes,
Attorney.

No. 847,607. PATENTED MAR. 19, 1907.
C. W. ROBINSON.
WHEEL MACHINE.
APPLICATION FILED AUG. 3, 1906.

Witnesses:
J. M. Daggett.
G. W. ...

Inventor:
Charles W. Robinson.
By J. C. Warnes,
Attorney.

No. 847,607. PATENTED MAR. 19, 1907.
C. W. ROBINSON.
WHEEL MACHINE.
APPLICATION FILED AUG. 3, 1906.

Witnesses:
J. N. Daggett,
F. W. Hoffmeister.

Inventor:
Charles W. Robinson
By J. C. Warner,
Attorney.

No. 847,607.

PATENTED MAR. 19, 1907.

C. W. ROBINSON.
WHEEL MACHINE.
APPLICATION FILED AUG. 3, 1906.

Witnesses:

Inventor:
Charles W. Robinson.
By J. C. Harris,
Attorney.

No. 847,607. PATENTED MAR. 19, 1907.
C. W. ROBINSON.
WHEEL MACHINE.
APPLICATION FILED AUG. 3, 1906.

Witnesses:

Inventor
Charles W. Robinson
By J. C. Warnes,
Attorney.

UNITED STATES PATENT OFFICE.

CHARLES WALRATH ROBINSON, OF HAMILTON, ONTARIO, CANADA, ASSIGNOR TO INTERNATIONAL HARVESTER COMPANY, A CORPORATION OF NEW JERSEY.

WHEEL-MACHINE.

No. 847,607. Specification of Letters Patent. Patented March 19, 1907.

Application filed August 3, 1906. Serial No. 329,052.

*To all whom it may concern:*

Be it known that I, CHARLES WALRATH ROBINSON, a citizen of the United States, residing at Hamilton, in the Province of Ontario, Dominion of Canada, have invented a new and useful Improvement in Wheel-Machines, of which the following is a complete specification.

This invention relates to machines for securing the spokes to the other wheel members, and is designed to secure spoke-blanks on which no shoulders have previously been formed to a hub and a closed rim. The hub and rim are supported upon a platen, which is yieldingly held against horizontal movement longitudinally of the machine and is movable vertically in order to bring the wheel members to and from a position to be operated upon by the spoke-fastening devices. Stock is provided for the shoulder on the spoke outside the hub by a yielding movement of the platen, which supports the hub and rim, while stock is provided for the shoulder inside the rim by an inward yielding of a segment of the rim, which has been sprung outwardly previous to the fastening of the rim end of the spoke.

The object of the invention is to produce a wheel-machine of simple construction and design, efficient in its operation, and adjustable in order to adapt it to operate upon wheels of different sizes.

The machine is adapted to operate upon spoke-blanks on which no shoulders have previously been formed, and practically all the movements are controlled by and the operations completed in the single advance and return stroke of the double cross-head.

These and other subordinate improvements will be hereinafter described, pointed out in the claims, and illustrated in the accompanying drawings, in which—

Fig. 9 represents an enlarged fragmentary longitudinal section taken adjacent to the presser-heads and the spoke-fastening devices which operate on the rim end of the spoke, the full lines showing the relative position of the parts before the movement begins and the dotted lines the position of the same parts after the operation is completed. Fig. 10 is a corresponding plan of the parts shown in Fig. 9. Figs. 13, 14, and 15 are detail views of the inside presser-head and the actuating mechanism therefor, representing, respectively, a plan, a side elevation, and a rear elevation of said mechanism. Fig. 17 is designed to show the manner in which the valves for admitting and releasing the air-pressure to and from the cylinder of the inside presser-head are controlled by an arm on the forward cross-head. Figs. 18 to 22, inclusive, are diagrammatic views illustrating the operation of the spoke-fastening devices.

The operating parts of the machine rest upon the base or bed A, made, preferably, in a single piece and which is provided on its upper face with the cross-head ways $a$. On one end of the base or bed are mounted the driving-gears, (designated as a whole by B,) and fixed adjustably upon said bed-plate intermediate of its length and some distance from each other are the bed-pieces C and D. These bed-pieces support, respectively, the hub end and the rim end spoke-gripping jaws $m$ and $n$, respectively. Two cross-heads E and F are placed upon the ways $a$ of the base A and have a longitudinal reciprocating movement thereon, these cross-heads being connected with each other and reciprocated through suitable connections with the driving-gears B. A vertically-movable and longitudinally-yielding wheel-member support G is placed over the bed-piece C, this support consisting of a platen for supporting the rim, a bridge and arbor mounted thereon for supporting the hub, and suitable guides, slides, and springs for controlling the movements of said platen. Jaw-actuating rams project inwardly from the cross-heads, these rams also carrying the heading-tools. The wheel-member support G has mounted upon it and made movable therewith the inside presser-head, which is designated as a unit by H. The outside presser-head I is mounted indirectly on the bed-piece D and through suitable connections is actuated by means on the ram of the cross-head E.

Figure 18:
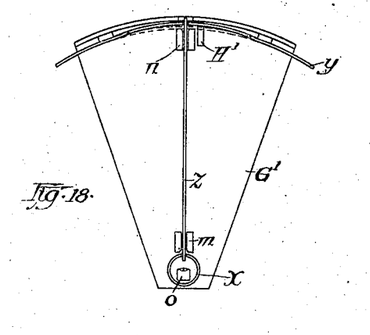
Fig. 18 shows the rim, hub, and a spoke in place and the inside presser-head after it has sprung a segment of the rim outwardly against the rim-support.
Figure 19:
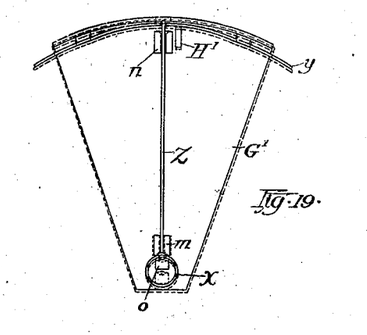
Fig. 19 illustrates the operation of the spoke-fastening devices on the hub end of the spoke, the full lines indicating the relative position of the wheel members and machine parts after the operation is completed, while the dotted lines indicate the positions of parts before the movement occurs and corresponds to the full-line position of the preceding figure.
Figure 20:
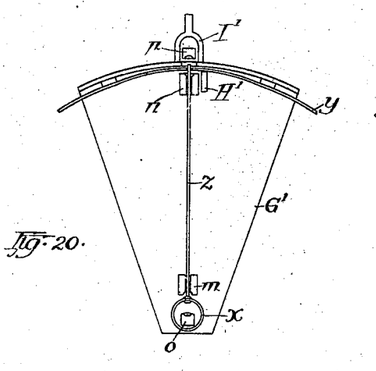
In Fig. 20 the hub end of the spoke has been secured and the outside presser-head has moved the platen supporting the hub and rim to a predetermined position or to a position in which just sufficient stock will be left between the rim and fixed jaws to form the shoulder inside the rim.
Figure 21:
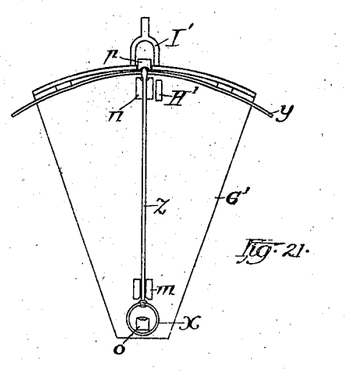
In Fig. 21 the jaws have gripped the spoke, the heading-tool has completed a portion of its movement, and the inside presser-head has been withdrawn.
Figure 22:
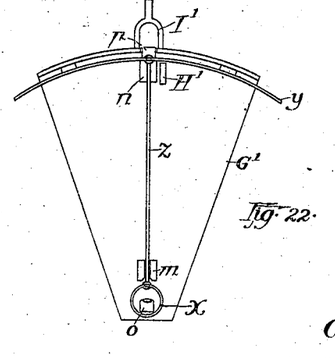
Fig. 22 shows the relative position of the wheel members and the spoke-fastening devices after the operation is completed.

The principle involved in the operation of the machine is illustrated in the diagrammatic views 18 to 22. The wheel members, consisting of the hub X, the rim Y, and spoke Z, are placed in their proper relative positions upon the horizontally-yielding wheel-member support G'. The rim $y$ is then sprung outwardly by the inside presser-head H' from the dotted to the full line position of Fig. 18. The hub-end jaws $m$ then grip the spoke and the heading-tool $o$ advances, upsetting the spoke and filling the spoke-aperture in the hub. The resistance of the spoke in the spoke-aperture will cause the yieldingly-mounted wheel members and support G' therefor to move, and thus permit a shoulder to be formed between the jaws $m$ and hub X and a head to be formed inside the hub. The several parts will then occupy the positions shown in Fig. 19. The cross-heads E and F have now completed their forward movement and immediately upon their return the hub-end jaws are released. The outside presser-head I' then moves the wheel-member support G' and wheel members mounted thereon bodily inward toward the fixed jaws $n$ until just enough stock is left between the rim and jaws to form the shoulder inside the rim. This distance is substantially equal to the amount the rim-segment has been sprung outwardly and the relative position of the different members at this stage of the movement is shown in Fig. 20. The rim-end jaws $n$ are now caused to grip the spoke, the rim-heading tool $p$ advances, and the initial upsetting of the end of the spoke begins. The presser-head I', the wheel members, and the wheel-member support G' remain stationary during the remainder of the operation. At the moment resistance to the upsetting of the spoke occurs in the spoke-aperture of the rim the inside presser-head H' will be released, the position of the parts at this stage of the movement being indicated in Fig. 21. The heading-tool $p$ continues to advance and the segment of the rim springs back to normal position when the upsetting of the head outside and of the shoulder inside the rim is completed. In Fig. 22 the position of the parts after the operation is completely shown.

It is to be understood that the ends of the spokes are preferably first heated before being operated upon. For clearness in the above brief description of the method of operation the preliminary and final steps of lowering and raising the wheel members to and from an operative position with respect to the spoke-fastening devices were omitted.

The description of the machine will now be taken up in detail. The sides of the base A are of an I-shaped cross-section and the driving-gears B are comprised of the main drive-shaft 1, having the pinions 2 (only one appearing in the drawings) and fly-wheel and pulley 3 secured thereto. The pinions 2 mesh with and drive the gears 4 on the counter-shaft 5. These large gears 4 impart a reciprocating movement to the cross-heads E and F, through the connecting-rods 6, which journal on their forward ends, one on each side of the cross-head F. The cross-heads E and F are connected by means of the side bars 8, the ends of which are threaded and engage an unthreaded aperture in the cross-heads, the nuts 8' fastening the side bars and also enabling the two cross-heads to be adjusted longitudinally, and thus adapt the machine to operate upon wheels of different sizes. The cross-heads are held in position on the ways $a$ of the base A by means of the side plates 9, which are held to the cross-heads by the bolts 10 and are arranged to engage the outer and under side of said ways. The gibs 11 enable the cross-heads to be adjusted closely against both lateral and vertical movement on their ways. On the inside or opposing faces of the cross-heads E and F are bolted the rams 12, which actuate the spoke-gripping jaws by means of the laterally-arranged cam-plates 13, these rams also carrying the hub and rim end heading tools 14 and 15, respectively.

Figure 4:
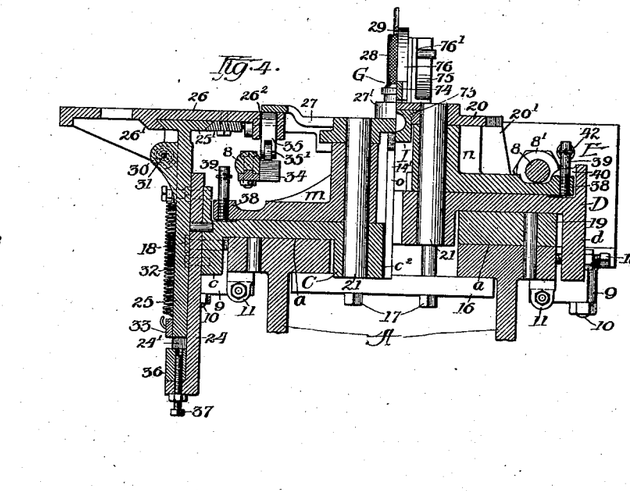
Fig. 4 represents a transverse vertical section, taken on the broken line 4 4 of Fig. 1, through different parts of the machine, the left-hand side of the figure showing a section on a transverse plane coincident with the pivotal axes of the jaws which operate on the hub end of the spoke and the right-hand side on a transverse plane coincident with the pivotal axes of the rim-end jaws.
Figure 5:
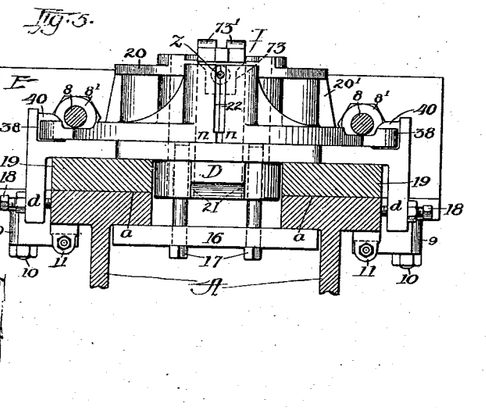
Fig. 5 is a transverse section through the base or bed of the machine, taken adjacent to the bed-piece and bed-piece cover, and is designed to show the construction of these parts and also the relative position of the rim-end jaws supported thereon.

On the top of the base A between the cross-heads are adjustably fixed the bed-pieces C and D, the bed-piece C supporting both the hub-end jaws $m$ and the wheel-member support G. On the bed-piece D are mounted the rim-end jaws $n$ and the outside presser-head. These bed-pieces (see Fig. 5) extend across the base of the machine, resting upon the ways $a$, and are held in place by the tie-bars 16, as shown in Figs. 4 and 5, the tie-bars being bound to the base by means of the bolts 17. The bolts 18, which extend through the downwardly-projecting end flanges $c$ and $d$ of the bed-pieces and bear against the outsides of the ways $a$, provide lateral adjustment for said bed-pieces and also aid in holding same in position, as well as the parts mounted thereon. The bolsters 19 (see Fig. 5) are placed beneath the rim-end bed-piece D in order to raise the parts mounted thereon to the proper height. Each bed-piece is provided with an upwardly-projecting flange 20', extending along its outer edge, and to this flange is bolted the cover-plate 20. Mounted upon the bed-piece C and beneath the cover-plate 20 thereon are the hub-end-opposing gripping-jaws $m$, having their pivotal axes on the pins 21, which engage the said cover-plate above and the bed-piece below. Similar jaws $n$ are mounted on the rim-end bed-piece D and beneath the cover-plate 20 thereon, the pins 21 forming the pivotal bearing for same. These jaws are provided on their inner ends with the spoke-engaging dies 22 and on their outer ends with the cam-rollers 23, which roll against and are actuated by the cams 13 on the rams 12. In laterally-projecting lugs 38 on the hub and rim end gripping jaws $m$ and $n$ are secured pins 39, (see Figs. 1, 4, and 6,) and formed on each side of the bed-pieces C and D and integral therewith are the apertured lugs 40 (see Figs. 1 and 4 to 8) and also the upwardly-projecting pins 41. Springs 42 (the one on the upper side in Fig. 1 being shown removed for clearness) are interposed between the pins 39 on the jaws and the pins 41 on the bed-pieces, the function of the springs being to hold the jaws open and that of the corresponding lugs 38 and 40 on the jaws and bed-pieces, respectively, to limit the extent of opening movement of said jaws. For each jaw of the two pairs there is provided such a set of correponding lugs and spring-supporting pins. Set-screws 43 are received by the lugs 40 on the bed-pieces, these set-screws bearing against the lugs 38 on the jaws and affording closer adjustment for the extent of opening movement of the jaws.

Figure 6:
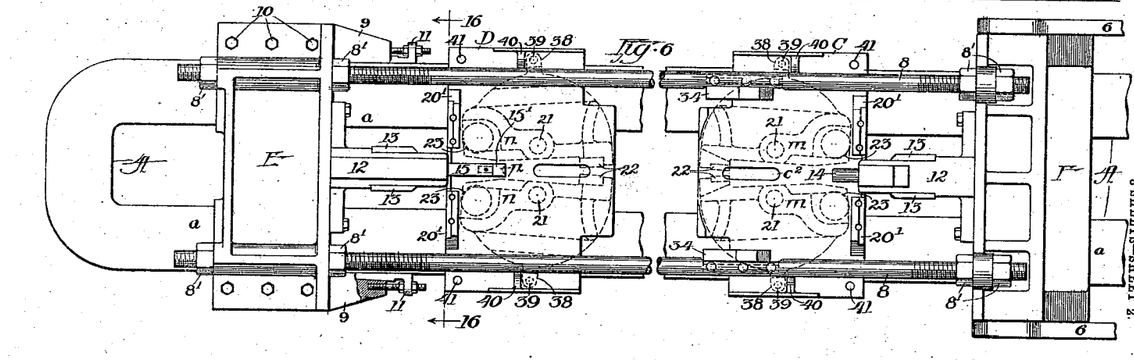
Fig. 6 represents a plan of the base or bed, the cross-heads mounted thereon and connected by means of the side bars, and the gripping-jaws and bed-pieces in their proper relative position.

The construction and arrangement of the cross-heads, rams, and spoke-gripping jaws are clearly shown in Fig. 6, and from an inspection of this figure it will be seen that movement of the cross-heads E and F forwardly or to the left will cause the ram 12, through the cam-plates 13, to actuate the hub-end-gripping jaws $m$, and in the same movement the heading-tool 14 will be advanced upon the end of the spoke. The cross-heads completing their movement forwardly, return, and in the return mevement the ram 12 on the forward cross-head E actuates the jaws $n$ in a like manner, while the heading-tool 15 will advance upon the rim end of the spoke. By such construction the heading-tools and gripping-jaws are actuated by mechanism which moves as a single piece, and this same mechanism, as will hereinafter appear, also positively lifts the wheel-member support after the fastening of each spoke.

Figure 2:
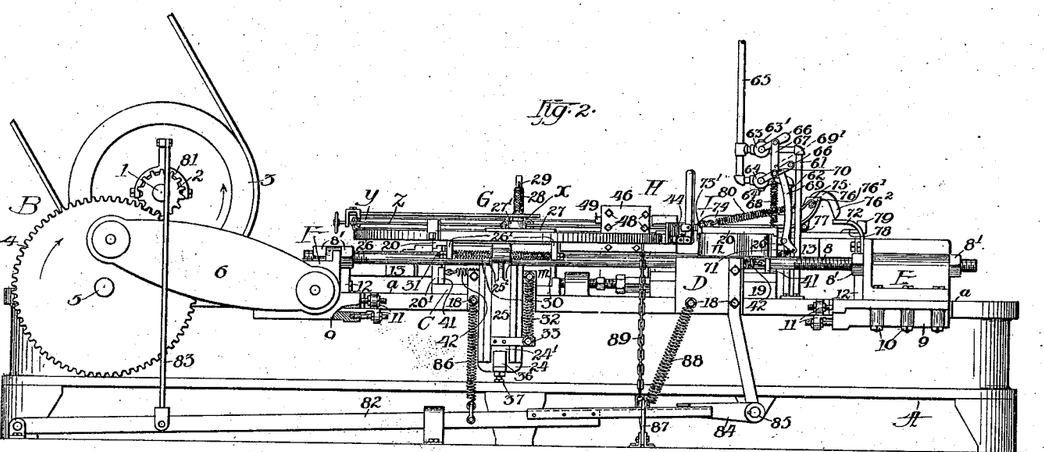
Fig. 2 is an illustration of the right-hand side of the complete machine.
Figure 3:
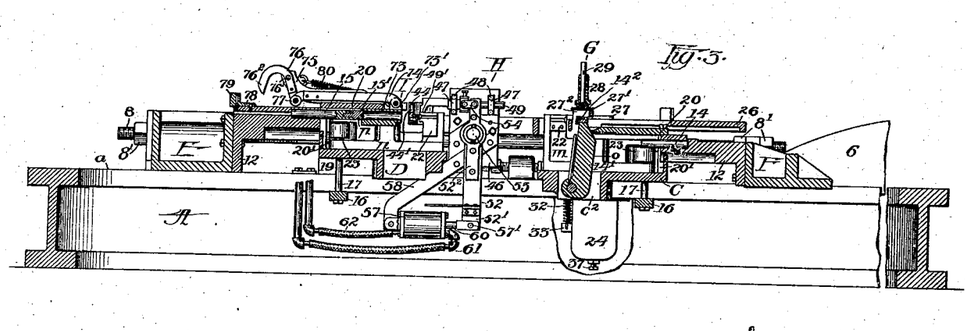
Fig. 3 is a central longitudinal section of the principal part of the machine, taken on the line 3 3 of Fig. 1.
Figure 7:
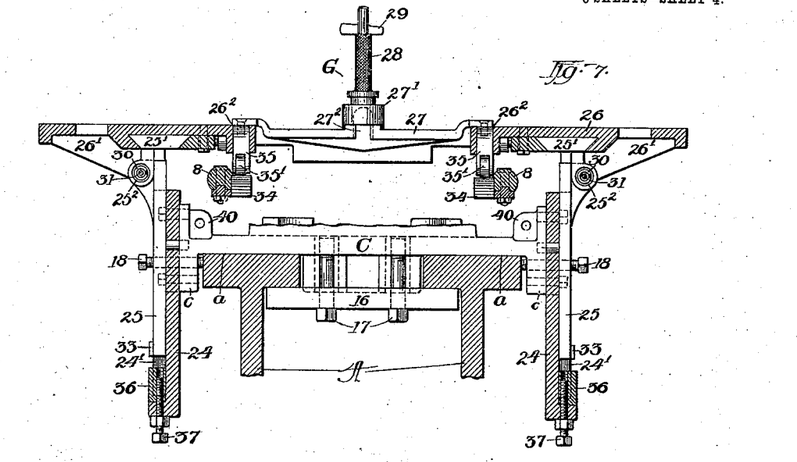
Fig. 7 shows a transverse section through the center of the platen and is designed to show the bridge on which the hub is supported, the securement of the bridge to the platen, the longitudinal guide for the platen, and the manner in which it is supported on the base.

The wheel-member support G, or, more accurately, the hub and rim support, is constructed as follows: To the sides of the rear bed-piece C are bolted the vertically-extending guides 24, (see Figs. 2, 4, 7, and 8,) in the dovetailed ways 24' of which fit the corresponding slides 25. These slides are provided at their upper ends with similar transversely-extending slides 25', which are in turn received by corresponding ways in the bottom of the platen 26. The platen 26 is of a circular outline, open in the center to receive the spoke-gripping jaws $m$ and heading-tool and presenting a flat upper surface, on which is placed the rim of the wheel being operated upon. A bridge 27 is made to extend across the central opening, and on this bridge is supported the hub-mandrel 28. The central boss 27' on the bridge is raised and cut away on its forward side, as shown in Figs. 3 and 7, the cut-away portion 27² permitting movement of the heading-tool. The key 29 holds the hub in place on the mandrel, and the bridge 27 is bolted or otherwise fixed on the platen. The slides 25 are free to move up and down in their ways 24′, carrying with them of course the platen 26. To hold said platen, which is free to slide in a direction longitudinal of the machine, normally in a central position with respect to its support, the springs 30 (see Figs. 2, 4, and 7) react between the sockets 25² on the slide 25 and the depending lugs 26′ on the platen 26, the through-rods 31 retaining the springs in place.

The above-described construction renders the platen or wheel-member support vertically movable and longitudinally yielding. The object of the vertical movement, as will presently more fully appear, is to carry the wheel members to and from an operative position with respect to the spoke-fastening devices, and the yielding longitudinal movement enables the wheel members to be moved bodily in relation to the fixed spoke-gripping jaws when the hub end of the spoke is upset and to also move away from the fixed jaws to clear same. In order to counterbalance the weight of the platen 26 and parts supported thereon, the springs 32, one on each side of the machine, connect the slide 25, through the transversely-extending arms 33, with a point on the frame of the machine.

Figure 1:
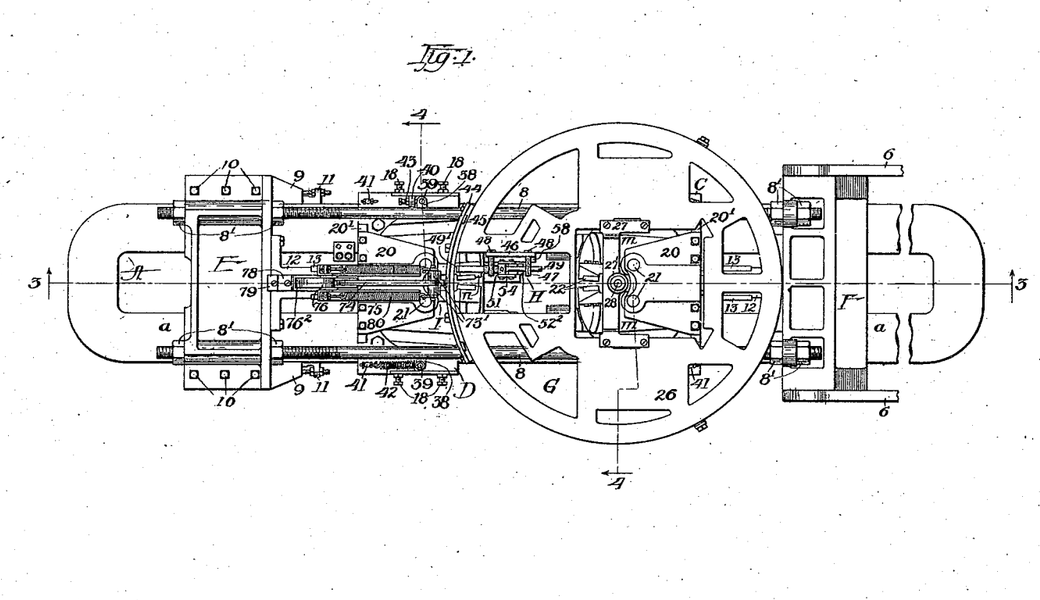
Figure 1 represents a plan view of the machine with the driving-gears omitted.
Figure 8:
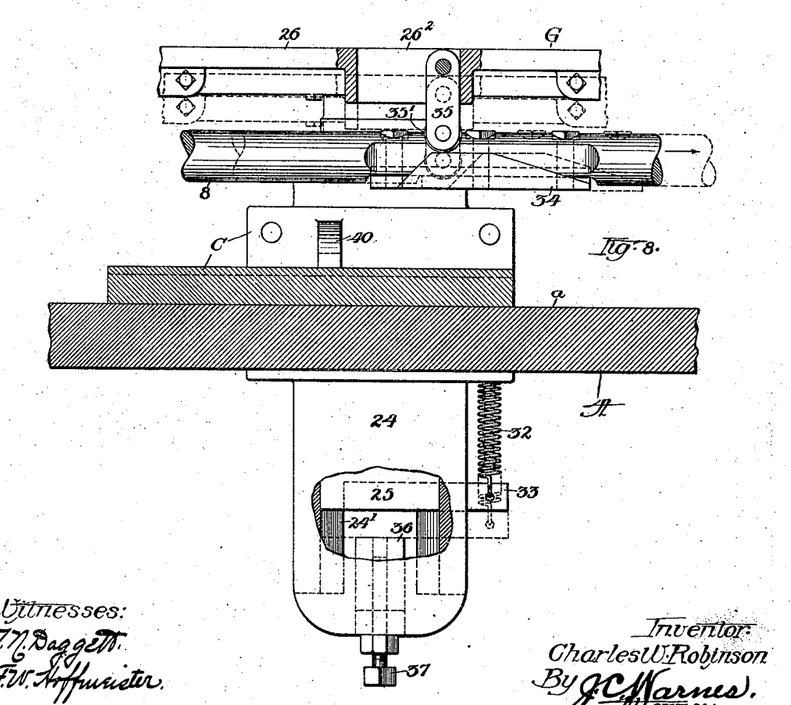
Fig. 8 represents an enlarged sectional elevation of a portion of the machine and is designed to show the vertical guides and the manner in which the platen is raised and lowered therein.

To positively raise the platen 26 that the spokes of the wheel may clear the gripping-jaws when turning to position for receiving the next spoke, a cam-block 34 (see Figs. 7 and 8) is secured to each of the side bars 8 in a position to move back and forth beneath the platen. Depending arms 35, arranged on each side of the platen and provided with the antifriction-rollers 35′, are pivotally mounted to swing in one direction longitudinally of the machine in the slots 26² of the platen. The fact that the arms 35 are pivoted near the front end of the slots 26² will render them rigid against movement in a forward direction, and hence as the cam-blocks 34 pass under said arms as the side bars 8 are moving rearwardly they will yield and the platen will not be raised; but as the bars are made to move forwardly the cams will engage the arms, and since they are rigid in this direction the platen will be raised. It therefore follows that as the cross-heads E and F are made to move forwardly from the position of rest shown in Fig. 8 the initial movement will permit the platen carrying the wheel members to drop to the dotted-line position of said figure, thus bringing the hub and rim to an operative position with respect to the spoke-fastening devices. In Fig. 8 the parts are shown in full lines in the position they occupy when at rest or after the operation of a single spoke has been completed, this position being substantially midway of the forward stroke. As the side bars 8, carrying the cam-blocks 34, return the arms 35 will drag over the blocks without effect; but as the movement on the forward stroke to the point of rest occurs the said arms will be engaged by the cam-blocks and the platen again raised. A vertically-adjustable block 36, controlled by the cap-screw 37, is placed in the lower end of the guideway 24′ on each side of the machine, the function of this block being to properly adjust the lower limit of movement of the platen in order to cause the wheel members to register accurately with the spoke-fastening devices. The platen is provided adjacent to the rim-end spoke-fastening device with an upwardly-projecting flange-segment 44, as shown in Figs. 1 to 3 and in detail in Fig. 10, this segment subtending an angle of about forty-five degrees and being symmetrically placed with respect to the longitudinal axis of the machine. An opening 44′ in the flange 44 admits the heading-tool 15 to the spoke end, and near the ends of said flange and on the inner face thereof are secured the distance-blocks 45, against which the wheel-rim $y$ rests.

Figure 11:
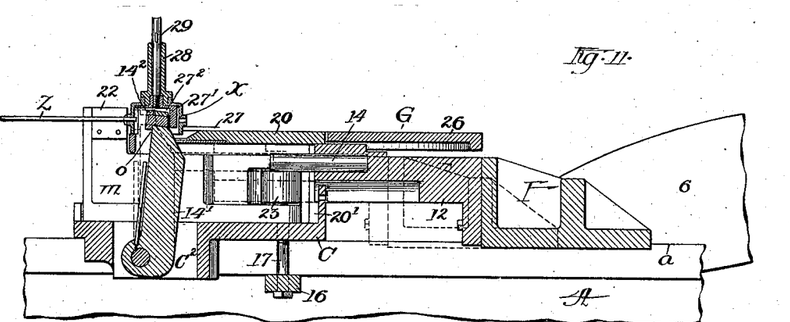
Fig. 11 is an enlarged fragmentary longitudinal section taken adjacent to the spoke-fastening devices which operate on the hub end of the spoke, the full and dotted lines showing, respectively, the relative position of the several parts before and after their movement in securing the spoke.

In a slot $c^2$ in the bed-piece C is pivotally mounted an arm 14′, (see Figs. 3 and 11,) which extends upwardly into the boss 27′ of the bridge 27, the said arm carrying at its upper end the spoke-heading die 14². This arm 14′ is actuated by the spoke-heading plunger 14 on the ram 12, the plunger bearing against the rear side of the arm. The indirect action of the plunger 14 on the spoke-header is made necessary in order to permit the die 14² to operate within the hub. On the rim-end spoke-fastening device the die 15′ is secured directly to the spoke-heading plunger 15, and when the platen 26 is in its lower position the die 15′ will engage the opening 44′ of the flange 44 in upsetting the spoke.

Figures 9, 10, 14, 15, 16:
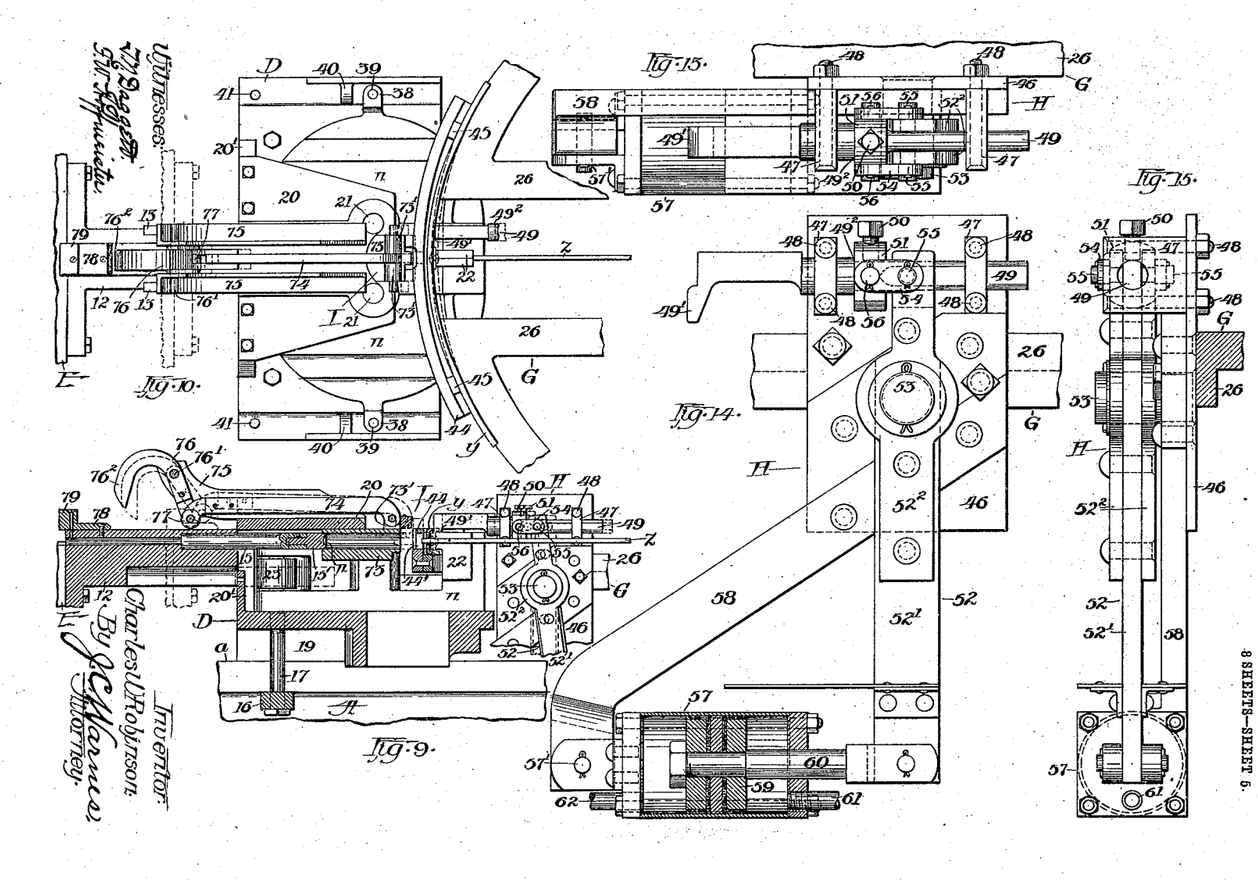

For holding the rim securely in place on the platen and to spring the segment thereof outwardly to provide stock for the shoulder inside the rim a presser-head (designated as a unit by H) is mounted upon the platen 26 and is shown in detail in Figs. 13, 14, and 15. The platen is provided with a large rectangular opening (see Fig. 1) on its forward side, surrounded by a depending flange, and to this flange at one side of the opening is bolted the presser-head frame 46. Two guide-blocks 47, having registering circular openings, are fixed to the upper end of the frame 46 by means of the bolts 48, and in these guide-blocks fits the reciprocating presser-head plunger 49, having on its forward end the rim-engaging depending foot 49′. This presser-head plunger is of circular cross-sections and of different diameters where it engages the blocks 47, thus leaving a shoulder 49², against which is held by the set-screw 50 the link-block 51. A vertically-extending lever 52 pivots on the frame 46, the stud 53 forming the pivotal bearing therefor. This lever, as will appear from an inspection of Figs. 14 and 15, is constructed of the central member 52' and the two upper side members 52², secured thereto. The side members at their upper ends straddle the plunger 49 and are secured to the link-block 51 by means of the two links 54, the links pivotally connecting with the side members 52² by means of the short stems 55 and with the link-block by means of the short stems 56.

Through the above-described link connection a rocking movement of the lever 52 will impart a reciprocating movement to the presser-head plunger 49. To actuate the lever 52, a cylinder 57 is pivotally mounted at 57' on the arm 58, which extends obliquely downward from the presser-head frame 46. A piston 59 connects with the lever 52 through the piston-rod 60. As the piston 59 moves back and forth in the cylinder 57 the pivotal bearing of the latter at 57' will permit the free end of the piston-rod 60 to move in the arc of a circle described by the lower end of the said lever 52. Pressure is admitted to the rear and front ends of the cylinder through the pipes 61 and 62, respectively, and it is apparent that when pressure is admitted in the front end of the cylinder the top of the lever 52 will be rocked toward the front end of the machine and the foot 49' of the presser-head plunger 49 will be forced against the rim. The release of pressure at the front end and the admission of same through the pipe 61 to the rear end of the cylinder will retract the plunger 49. The three-way cock 63 (see Fig. 17) controls the pressure to the pipe 61, and a similar cock 64 controls the pressure to the pipe 62, both of these cocks being fed from the pipe 65. The cocks 63 and 64 are each provided with a handle 66, and the two handles are connected by means of a link 67. A spring 68 tends normally to hold the cock-lever handles 66 down, in which position the cock 64 will be shut against pressure from the feed-pipe 65 and open to the release, so the air will escape from the cylinder through the outlet 64'. In the lower position of the handles 66 the cock 63 will be just the reverse of the cock 64—i. e., open to admit high pressure to the cylinder and closed to the exhaust 63'. It will therefore be seen that when the cock-handles are raised pressure will be admitted to the forward or right end of the cylinder, as seen in Fig. 17, thus actuating the piston and pushing the foot 49' of the presser-head plunger against the rim $y$ and spring it forwardly from the dotted to the full line position shown in Fig. 10.

When the handles occupy the dotted-line position of Fig. 17, pressure will flow to the rear end of the cylinder 57 and the presser-head plunger 49 will be withdrawn from the wheel-rim. In operating the machine the presser-head is caused to move forwardly by lifting the handles 66 by manual effort, and to release the presser-head the following-described means are employed: The pivotally-mounted arm 69 is made to bear yieldingly against the pin 70 in the lower cock-lever 66 by means of the spring 71, a notch 69' in the upper end of said arm engaging the pin. When the levers 66 are up and pressure is established in the forward end of the cylinder 57, the arm 69 will hold the levers up against the action of the spring 68. As the rim end of the spoke is being upset, however, it becomes necessary to withdraw the presser-head plunger from the rim at a certain definite time during the movement of the upsetting-tool 15. This is accomplished by means of the bent tappet 72, which is secured to the cross-head E and arranged to contact the pivoted arm 69 as the cross-head moves rearwardly. The tappet 72 will rock the said arm against the action of the spring 71 to the dotted-line position of Fig. 17, disengaging the notch 69' from the pin 70 and permitting the spring 68 to draw the arms 66 down, and thereby reverse the pressures in the cylinder 57. In order to permit the presser-head H to rise, and fall with the platen without disturbing the valve arrangement above described, the horizontal runs of the pipe 61 and 62 are made flexible. The function of the inside presser-head H, above described, is to spring the segment of the rim $y$ between the distance-blocks 45 outwardly and hold the rim fixed during a portion of the operation.

To move the wheel-member support G and the wheel members mounted thereon longitudinally to a position in which the rim will be made to gage properly with the spoke-gripping jaws $n$, the outside presser-head I is provided. This presser-head consists of a reciprocating hollow plunger 73, (see Figs. 5, 9, and 10,) arranged to slide in suitable ways on the under side of the cover-plate 20. Near the forward end of the said plunger are the two upwardly-projecting lugs 73', between which is pivotally mounted the link 74. On the fixed support 75 is pivoted the bent lever 76, the pivotal point being at 76'. This lever 76 connects with the forward end of the link 74. An antifriction-roller 77 is mounted on the pivotal axis between the lever 76 and the link 74, and to actuate the plunger 73 a cam-block 78, secured to the ram 12, is adapted to engage said roller and move the parts from the full to the dotted line position of Fig. 9, or a distance sufficient to bring the rim $y$ to the proper gage position from the jaws $n$. As previously explained, this distance is just sufficient to provide sufficient stock between the inside of the rim and the face of the jaws, and the platen 26 in this advance of the presser-head yields sufficiently to permit of such movement. The heading-tool 15 and the die $p$ thereon slide through the opening in the hollow plunger 73 of the presser-head and when operating also project through the opening in the flange 44 of the platen. To positively return the plunger 73, a downwardly-projecting arm or hook $76^2$ is formed, preferably integral with the lever 76, the arrangement being such that when the plunger 73 occupies its position nearest the platen the said arm or hook projects into the path of the stop 79, which lies adjacent to the cam-block 78. The result of this construction will be to cause a positive return of the plunger by the hook $76^2$ engaging the stop 79 whenever the springs 80 fail to effect such movement.

Figures 12, 16:
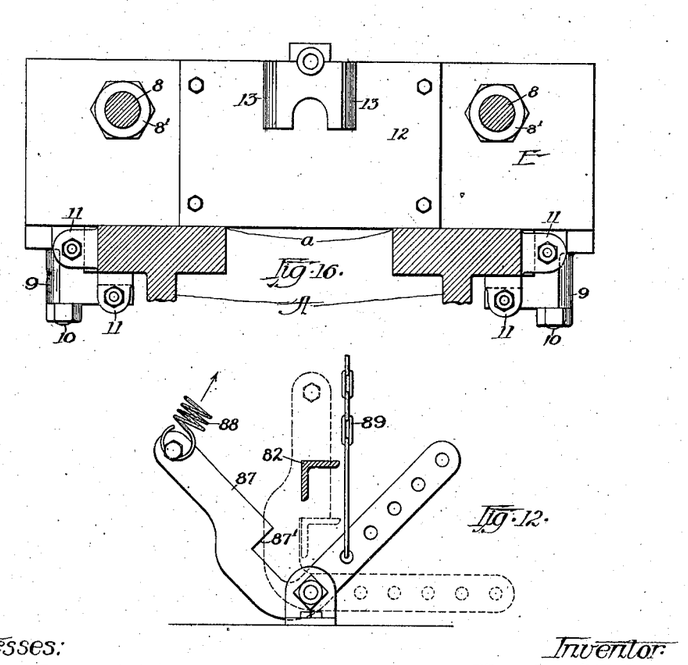
Fig. 12 is a detail of the notched bell-crank for locking in an operative position the clutch-controlling lever.
Fig. 16 is a transverse section through the bed adjacent to the forward cross-head, taken as indicated by the line 16 16 in Fig. 6.

The machine is thrown into and out of operation by means of the clutch 81 on the driving-shaft 1, this clutch being controlled by the lever 82 and the rod 83, which connects the clutch and lever. A foot-lever 84, mounted on the cross-shaft 85, and which may be operated from either side of the machine, bears upon the free end of the lever 82. A spring 86 connects the lever 82 with the machine-frame and acts to hold the clutch 81 out of engagement. When the said lever 82 is depressed to the dotted-line position of Fig. 12, it will be engaged by the notch 87' in the bell-crank lever 87, the notched arm of this lever being held normally in a vertical position by the spring 88, which connects at its upper end to the machine-frame. To positively disengage the lever 82 from the notch 87', a chain connection 89 extends from one arm of the lever 87 to the platen 26, with the result that when the platen is raised at the end of each cycle of its operation the bell-crank lever 87 will be moved to the full-line position of Fig. 12, and the clutch-lever 82 thereby released.

As the mode of operation of the various parts has been given in connection with the detailed description thereof, it is thought a brief statement of the general operation of the machine will be sufficient. Assuming that the machine is at rest and that the platen is in its elevated position, as shown in Fig. 2, a hub X is placed upon the mandrel 28 and fastened down with the key 29. A rim Y is then placed upon the platen 26, and the inside presser-head H is made to engage the same and spring a segment of the rim outwardly by admitting air-pressure to the forward end of the cylinder 57, as before described. A spoke Z with its ends heated is now placed in position in the hub and rim and the machine started by depressing the foot-lever 84. The driving-gear 4, rotating in the direction indicated, will move the cross-heads E and F forwardly, allowing the wheel-member support G to drop and bring the spoke between the gripping-jaws $m$ and $n$. As the cross-heads move forwardly the ram 12 actuates the jaws $m$, the dies 22 grip the spokes, and through the spoke-heading plunger 14, the arm 14', and the die $o$ on said arm the spoke-head in the hub and the shoulder outside the hub are formed. The platen 26 yields sufficiently as the heading-tool advances to permit of the shoulder outside the hub being formed, the friction between the spoke and hub producing such yielding movement. The hub end of the spoke will have been secured by the time the cross-heads E and F reach the forward end of their stroke, and on the return movement thereof the following steps occur in the order given: The hub-end gripping-jaws are first released. The outside presser-head I, actuated by the cam-block 78 on the ram 12, then advances, bearing against the flange 44 of the platen and moving same until the rim $y$ is brought to the proper gage position with respect to the jaws $n$, after which said presser-head remains stationary, as does also the platen. The ram 12, carrying the heading-tool 15 and die $p$ thereon, continues to advance, engaging the spoke end and starting to upset same. After the initial upsetting of the spoke end occurs or when the end of the spoke has been upset until a shoulder begins to form inside the rim the inside presser-head H is released by the bent tappet 72 in the manner heretofore described. As the heading-tool continues from this stage of the operation the outwardly-sprung segment of the rim $y$ yields inwardly, thus providing stock for a shoulder inside the rim, and by the time the sprung segment reaches normal position and lies against the gripping-jaws $n$ the rim end of the spoke will be secured. The cross-heads have now reached their most rearward position and return forwardly to the position of rest, which is preferably at about mid-stroke. In this final forward movement the cam-block 34 on the side bars 8 engages the arms 35 and raises the platen and wheel members thereon, so that the wheel may be turned to position for the next spoke, the spoke introduced, and the operation repeated.

What I claim as my invention, and desire to secure by Letters Patent, is—

1. In a machine of the class described, in combination, a base suitably mounted, driving-gears, two reciprocating cross-heads slidably mounted on said base and operated by said driving-gears, said cross-heads moving as a single piece, means fixed to the adjacent sides of said cross-heads for actuating the spoke-gripping jaws and for upsetting the spoke ends, and spoke-gripping jaws mounted on said base.

2. In a machine of the class described, in combination, a base suitably mounted, driving-gears journaled on one end thereof, two reciprocating cross-heads slidably mounted on said base and operated by said driving-gears, side bars for adjustably connecting the two cross-heads with each other, rams fixed to the adjacent sides of said cross-heads, spoke-heading tools in operative connection with said rams, and two pairs of spoke-gripping jaws mounted on said base and actuated by the rams.

3. In a machine of the class described, in combination, a base suitably mounted, driving-gears journaled on one end thereof, two reciprocating cross-heads slidably mounted on said base and operated by said driving-gears, side bars for adjustably connecting the two cross-heads with each other, two pairs of spoke-gripping jaws mounted on said base, a ram mounted on each of said cross-heads, one of said rams arranged to actuate one pair of said spoke-gripping jaws on the forward movement of the cross-heads, and the other ram to actuate the other pair on the return movement of same, and spoke-heading tools in operative connection with said rams.

4. In a machine of the class described, in combination, a base, driving-gears journaled on one end thereof, two pairs of spoke-gripping jaws mounted on said base, opposing spoke-heading tools, and single reciprocating means operated by said driving-gears and provided with devices for actuating said spoke-gripping jaws and heading-tools.

5. In a machine of the class described, in combination, a base, driving-gears journaled at one end thereof, two pairs of spoke-gripping jaws mounted on said base, a vertically-movable wheel-member support, opposing spoke-heading tools, and single reciprocating means actuated by said driving-gears and provided with devices for operating said spoke-gripping jaws, for positively raising said wheel-member support and permitting it to drop, and for actuating said heading-tools.

6. In a machine of the class described, in combination, a base, driving-gears journaled on one end thereof, two pairs of spoke-gripping jaws mounted on said base, a vertically-movable, longitudinally - yielding wheel-member support, opposing spoke-heading tools, and single reciprocating means actuated by said driving-gears and provided with devices for permitting the said wheel-member support to drop in its forward movement and for raising it in its return movement, and for operating the said jaws and the spoke-heading tools.

7. In a machine of the class described, in combination, a base, driving-gears journaled on one end thereof, two bed-pieces fixed to and longitudinally adjustable upon said base, a pair of spoke-gripping jaws mounted upon each bed-piece, cross-heads operated by the driving-gears and located outside the bed-pieces and slidably mounted thereon, jaw-actuating rams, and spoke-heading tools in operative connection with said cross-heads, and a wheel-member support.

8. In a machine of the class described, in combination, a base, driving-gears journaled on one end thereof, two pairs of spoke-gripping jaws mounted on said base, a vertically-movable, longitudinally - yielding wheel-member support elastically held normally in a central position by opposing springs, single reciprocating means actuated by said driving-gears for controlling the movement of the spoke-gripping jaws and the said wheel-member support, and opposing heading-tools in operative connection with said reciprocating means.

9. In a machine of the class described, in combination, mechanism for actuating the spoke-gripping jaws and heading-tools, spoke-gripping jaws, spoke-heading tools in operative connection with said mechanism, and a wheel-member support arranged to yield longitudinally independently of said spoke-gripping jaws and heading-tools, said wheel-member support being actuated in its longitudinal movement by the upsetting of the spoke.

10. In a machine of the class described, in combination, mechanism for actuating the spoke-gripping jaws and heading-tools, fixed spoke-gripping jaws, spoke-heading tools in operative connection with said mechanism movable with each other and coöperating with said jaws, and a vertically-movable, longitudinally-yielding platen for supporting the wheel members, said platen being actuated in its longitudinal movement by the upsetting of the spoke.

11. In a machine of the class described, in combination, spoke-fastening devices, means for actuating same a vertically - movable, longitudinally-yielding wheel - member support, and a yielding presser-head mounted on said wheel-member support and adapted to bear against the inside of the wheel-rim.

12. In a machine of the class described, in combination, a hub-end and rim-end spoke-fastening mechanism, each comprising a pair of fixed spoke-gripping jaws and a longitudinally-movable heading device, a wheel-member support, a yielding, inside presser-head mounted on said support, means for forcing said presser-head against the inside of the rim and an outside presser-head arranged to be actuated by the rim-end heading device.

13. In a machine of the class described, in combination, a hub-end and a rim-end spoke-fastening mechanism, each comprising a pair of fixed spoke-gripping jaws and a longitudinally-movable heading device, a wheel-member support, a yielding, inside presser-head mounted on said support, means for forcing said presser-head against the inside of the rim, and an outside presser-head operatively connected to said heading device and arranged to be actuated only during the initial forward movement thereof.

14. In a machine of the class described, in combination with a vertically-movable, longitudinally-yielding wheel-member support, a yielding presser-head mounted on said support and arranged to bear against and spring a segment of the rim outwardly, means for forcing said presser-head against the inside of the rim, hub and rim end spoke-fastening devices, each comprising fixed jaws and a heading-tool, an outside presser-head adapted to bear against and move the wheel-member support inwardly and bring the rim to position at a predetermined distance from the fixed jaws of the rim-end spoke-fastening device, and means for actuating the outside presser-head.

15. In a machine of the class described, in combination with a vertically-movable, longitudinally-yielding wheel-member support, a presser-head mounted on said support and arranged to bear against and spring a segment of the rim outwardly, hub and rim end spoke-fastening devices, each comprising fixed jaws and a heading-tool, means for actuating said spoke-fastening devices, an outside presser-head adapted to bear against and move the wheel-member support inwardly and bring the rim to position at a predetermined distance from the fixed jaws of the rim-end spoke-fastening device, and positive means for returning the said outside presser-head.

16. In a machine of the class described, in combination, a machine-frame, spoke-fastening devices mounted thereon, a vertically-movable, wheel-member support, and counterbalancing-springs interposed between said wheel-member support and the machine-frame.

17. In a machine of the class described, in combination, a machine-frame, spoke-fastening devices, a vertically-movable wheel-member support, an adjustable stop secured to the machine-frame for controlling the lower position of said support, and counterbalancing-springs interposed between the wheel-member support and the said machine-frame.

18. In a machine of the class described, in combination, a hub and a rim end spoke-fastening device, a hub and rim support arranged to yield longitudinally as the hub end of the spoke is being secured, an inside presser-head mounted on said support and constructed to bear against and spring a segment of the rim outwardly and yield inwardly as the rim-end spoke-fastening device secures the rim end of the spoke in place, and an outside presser-head actuated by the rim-end spoke-fastening device and operating to move the hub and rim support to a gage position with respect to the rim-end jaws.

19. In a machine of the class described, in combination with the heading-tool and spoke-gripping jaws, a longitudinally-yielding hub and rim support, means for forcing said support against the rim, an inside presser-head mounted on said support, an outside presser-head comprising a sliding plunger arranged to press against the hub and rim support, a lever pivotally mounted on the machine-frame, a link connecting said plunger and lever, and a spring operating to hold the plunger in its rearward position, and means in connection with said heading-tool for engaging the lever 4 actuating the said outside presser-head.

20. In a machine of the class described, in combination, a reciprocating cross-head, a jaw-actuating ram and a heading-tool fixed to said cross-head, spoke-gripping jaws, a cam-block mounted on said ram, a longitudinally-yielding hub and rim support, an inside presser-head mounted on said support, means for forcing said support against the rim, an outside presser-head comprising a sliding plunger arranged to press against the hub and rim-support, a lever pivotally mounted on the machine-frame, a link pivotally connecting said plunger and lever, a roller journaled at the pivotal connection thereof and adapted to be engaged by the cam on said ram, thereby positively moving said presser-head forwardly, and a spring operating normally to hold the plunger in its rearward position, and means for positively returning said presser-head, consisting of a downwardly-projecting arm, or hook, integral with the said lever of the presser-head, and a stop on said ram adjacent to the cam-block, the said stop lying in the path of said arm, or hook, when the said presser-head occupies its forward position.

21. In a machine of the class described, in combination with the spoke-fastening devices a vertically-movable, longitudinally-yielding wheel-member support comprising a circular rim-holding platen having longitudinally-extending guideways on its under side and a large central opening, a bridge secured to said platen and extending across said opening, a hub-mandrel mounted on said bridge, vertically-extending guides secured to the machine-frame, slides provided with transversely-extending guides at their upper ends which engage the longitudinally-extending ways on the under side of said platen, horizontally-arranged springs for holding the platen yieldingly in a central position, a vertically-adjustable block placed at the lower end of said vertically-extending guides for limiting the drop of said platen, springs for counterbalancing the weight of said platen, and means in connection with said spoke-fastening device for positively raising the platen.

22. In a machine of the class described, in combination with the reciprocating cross-heads and the side bars for connecting same, a platen provided with suitable guides for permitting both a horizontal and a vertical movement, springs acting to hold said platen in its central position horizontally, cam-blocks fixed to said side bars, and depending arms movable in one direction pivotally secured to said platen and arranged to engage said cam-blocks and lift the platen as the bars are reciprocated.

23. In a machine of the class described, in combination, a vertically-movable, longitudinally-yielding wheel-member support and an inside presser-head mounted thereon, said presser-head comprising a frame, a plunger longitudinally movable therein, a cylinder and piston pivotally mounted at the lower end of the frame, a vertically-arranged lever pivoted on the frame and connecting above with said plunger and below with said piston, and means for controlling the admission and release of air to said cylinder.

24 In a machine of the class described, in combination, a vertically-movable, longitudinally-yielding wheel-member support and an inside presser-head mounted thereon, said presser-head comprising a frame, a plunger longitudinally movable therein, a cylinder and piston pivotally mounted at the lower end of the frame, a vertically-arranged lever pivoted on the frame and connecting above with said plunger and below with said piston, a manually-operated valve for controlling the admission of air to said cylinder, and automatically actuated mechanism for releasing the air-pressure at a predetermined time.

CHARLES WALRATH ROBINSON.

Witnesses:
RICHARD BUTLER.
J. C. WARNES.